Feb. 18, 1969 NED CHANG ETAL 3,428,950

PROGRAMMABLE CALCULATING APPARATUS

Filed March 22, 1966 Sheet 1 of 2

United States Patent Office 3,428,950

Patented Feb. 18, 1969

3,428,950

PROGRAMMABLE CALCULATING APPARATUS

Ned Chang, Arlington, Mass., Prentice I. Robinson, Hudson, N.H., and An Wang, Lincoln, Mass., assignors to Wang Laboratories Inc., Tewksbury, Mass., a corporation of Massachusetts Filed Mar. 22, 1966, Ser. No. 536,416

U.S. Cl. 340—172.5 9 Claims

Int. Cl. G11b *13/00*

ABSTRACT OF THE DISCLOSURE

A calculator includes a keyboard for entering numerical values into an arithmetic unit and issuing instructions to control the operation of the arithmetic unit. A card reader is also coupled to the arithmetic unit and can enter numerical values and issue control instructions also. A program counter normally addresses the card reader in a predetermined sequence. The logic responsive to the card reader causes a branch in the program sequence in response to a series of three instructions, the first two entering numerical values in the work (input) register of the arithmetic unit and the third transferring the contents of the arithmetic unit to the program counter.

This invention relates to calculating apparatus and provides an arrangement which enables the apparatus to operate pursuant to a series of instructions and to perform branching operations.

Calculators (devices without large capacity data storage) have ability to perform many of the complex mathematical manipulations of which large general purpose computers are capable. But typically they do not have the ability to perform, automatically, a series of instructions in the nature of a program. In general, the lack of sufficient storage in calculators has precluded the efficient use of a program, for rarely are useful programs merely an invariable series of steps; generally, decisions must be made pertaining to the data being operated on, which decisions determine alternatives that the program may follow. The inability of the typical calculator to make decisions means that a human operator must be interposed each time a decision is to be made. Also, it is frequently desirable to repeat a particular operation and the ability to reuse program steps becomes significant.

Decisions are made in programmed computers by branching on a predetermined condition. In computers, branching is effected by an instruction, the address part of which specifies the address in storage at which the next instruction in the program is to be found. Calculators, not having sufficient storage facilitaties, have been unable to perform branching in this manner.

Accordingly it is an object of this invention to provide novel apparatus for increasing the flexibility, and capacity of a calculator for performing complex mathematical operations, while maintaining its low cost, compactness and simplicity of design.

Another object of this invention is to provide a calculator system which can perform a series of instructions, in the nature of a program, automatically and without the need for a large storage capacity, which instructions contain an operation portion but no address portion.

A further object of this invention is to provide a calculator system which can, upon the basis of results of a calculator operation, select a non-successive instruction in a pre-established series of instructions.

A further object of the invention is to provide a calculator system operative in response to instructions having operation portions only which can branch to any instruction in a pre-established series of instructions.

The invention features calculating apparatus having means for supplying a series of identifiable instructions to the apparatus, counting means to identify an instruction to be performed by the apparatus, means responsive to the supplying means for executing instructions supplied, means for testing for a predetermined condition in the apparatus, means responsive to the executing means for stepping the counting means to identify the next instruction in the series of instructions and means responsive to the testing means to step the counting means a fixed number of steps to identify an instruction other than the next instruction when the predetermined condition is present. In a particular embodiment the instruction executing means includes an arithmetic unit having a register, means responsive to the instruction supplying means for loading an instruction identity in the register, and transfer means responsive to the testing means to transfer that instruction identity to the counting means to cause said instruction supplying means to supply that instruction to the instruction executing means.

Further features include a second counting means for monitoring the number of times a particular operation is performed by said executing means, a second transfer means responsive to the executing means for transferring a value in the register to the second counting means, and means for modifying the value in the second counting means in response to the signals from the executing means, the testing means being actuated by the executing means to test the other counting means for a predetermined value.

Other objects, features, and advantages will appear from the following description of a particular embodiment of the invention, taken together with the attached drawings thereof, in which.

Figure 1:
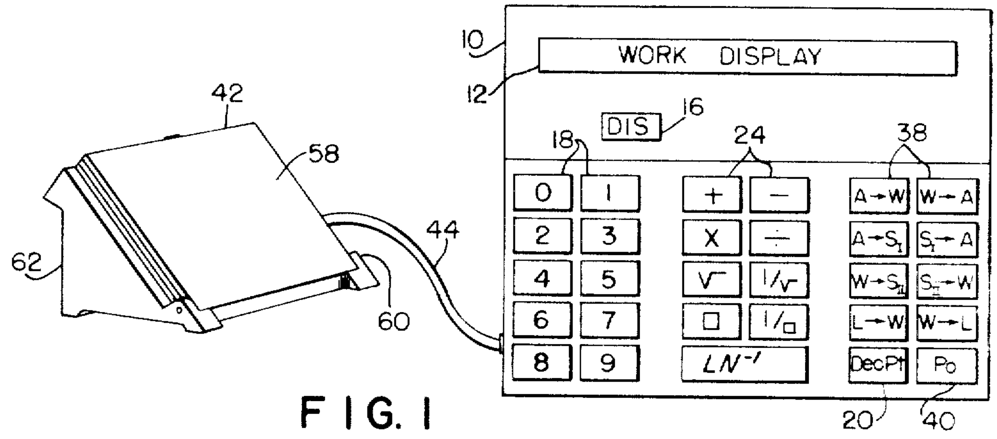
FIG. 1 is a view of a calculator system including a card reader constructed in accordance with the invention.
Figure 6:
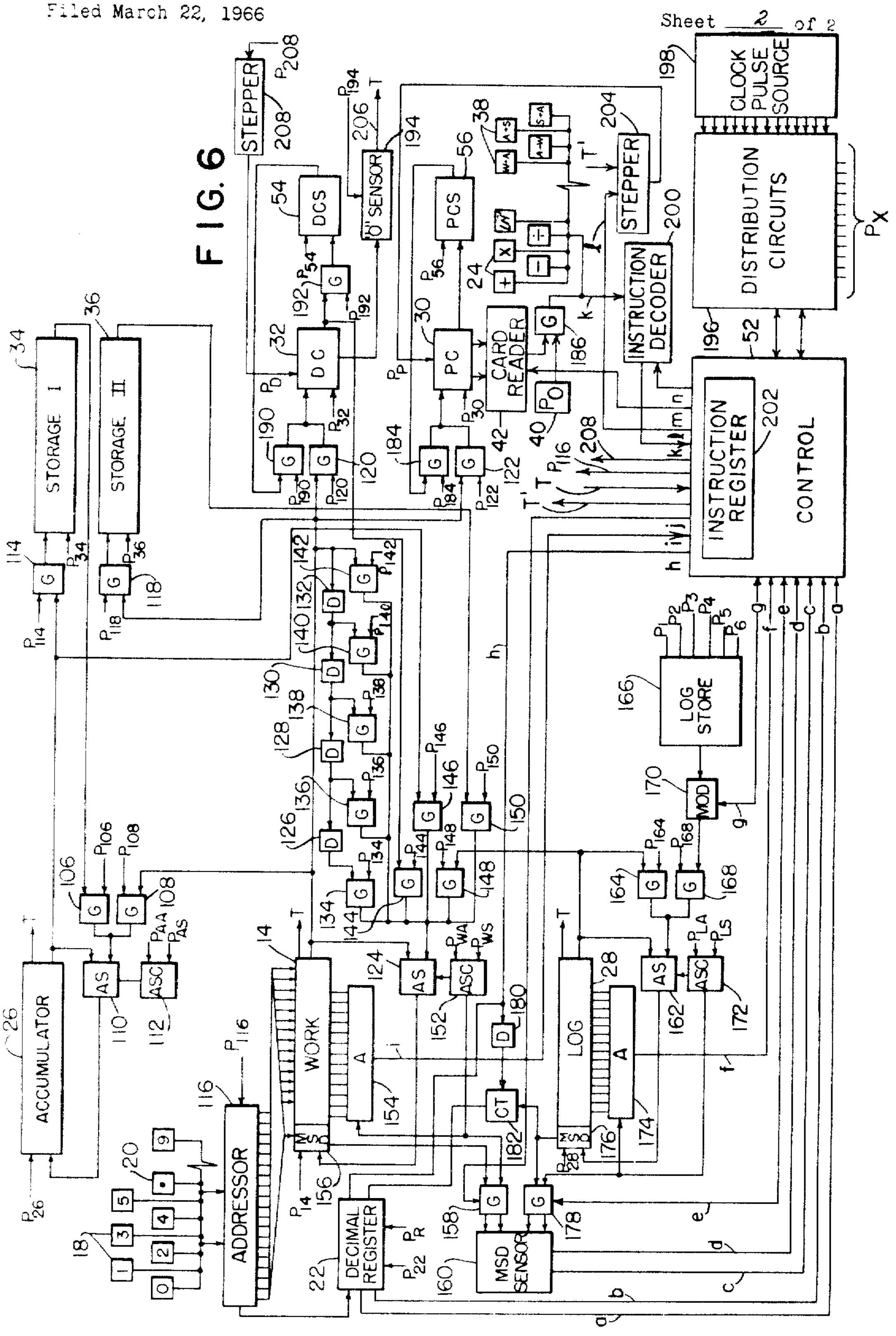
FIG. 6 is a block diagram of the calculator system shown in FIG. 1.

There is shown in FIG. 1 a diagrammatic view of the Calculator 10 and Display 12 for visually presenting the contents of Work Register 14, FIG. 6, upon command of Display Key 16. Numeral Keys 18 and Decimal Point Key 20, when operated, place their information in Work Register 14 and Decimal Register 22, respectively. Operations desired to be performed by Calculator 10 may be selected by the use of Instruction Keys 24. Data contained in Work Register 14, Accumulator Register 26, Log Register 28, Program Counter 30, Decrement Counter 32 and Storage Registers 34 and 36, FIG. 6, may be removed to another register by use of Transfer Keys 38.

The following tables correlate the functions of the various keys with their characters:

TABLE I.—TRANSFER KEYS

| Character | Function |
|---|---|
| A⟶W | Transfer contents of Accumulator Register 26 to Work Register 14. |
| W⟶A | Transfer contents of Work Register 14 to Accumulator Register 26. |
| A⟶$S_1$ | Transfer contents of Accumulator Register 26 to Storage I 34. |
| $S_1$⟶A | Transfer contents of Storage I 34 to Accumulator Register 26. |
| W⟶$S_2$ | Transfer contents of Work Register 14 to Storage II 36. |
| $S_2$⟶W | Transfer contents of Storage II 36 to Work Register 14. |
| W⟶L | Transfer contents of Work Register 14 to Log Register 28. |
| L⟶W | Transfer contents of Log Register 28 to Work Register 14 |

TABLE II.—INSTRUCTION KEYS

| Character: | Function |
|---|---|
| + | Add. |
| − | Subtract. |
| × | Multiply. |
| ÷ | Divide. |
| √‾‾ | Calculate square root. |
| 1/√‾‾ | Calculate reciprocal of square root. |
| □ | Calculate square. |
| 1/□ | Calculate reciprocal of the square. |
| $LN^{-1}$ | Generate antilogarithm. |

There is not a separate key for generating the logarithm; depression of the Multiplication Key (×) after placing a number in Work Register 14 causes the logarithm of the number to be accumulated in Log Register 28. $P_0$ Key 40, when operated, removes control of the Calculator 10 from Keys 18, 20, 24, and 38 and places it in Card Reader 42, attached to the Calculator 10 by Cable 44.

Card 46 (shown in FIG. 5) has a matrix of pre-scored positions arranged in forty columns 48 and twelve rows 50. Each position may be punched to form an aperture using only a pencil. Each column 48 is composed of two groups 51 of 6 data positions each. Card 46 is capable of introducing to Calculator 10, through Card Reader 42, all instructions, transfers, and values provided by Keys 18, 20, 24, and 38 as well as additional functions. The 6 bit binary code provided by a reading of an address on a punched card 46 is decoded within Card Reader 42 to present the same form of signals to Control 52 as is received from Keys 18, 20, 24 and 38.

In the following chart certain of the commands which may be programmed on Card 46 are listed and explained. The number to the left of each command is its representation in octal code. To obtain the corresponding code for punching on a program card, the octal digits are weighted in sequence 40, 20, 10, 4, 2 and 1. For example, the code for $W \longleftrightarrow PC$ is 27, and is punched as follows:

TABLE III.—PROGRAM CODE

| Code | Command | Remarks |
|---|---|---|
| (00) | Not assigned | |
| (01) | Prime | Clear all registers. |
| (02) | √‾‾ | Calculate square root. |
| (03) | 1/√‾‾ | Calculate reciprocal of square root. |
| (04) | □ | Calculate square. |
| (05) | 1/□ | Calculate reciprocal of square. |
| (06) | × | Multiply. |
| (07) | + | Add. |
| (10) | $LN^{-1}$ | Generate antilogarithm. |
| (11) | − | Subtract. |
| (12) | . | Decimal point. |
| (13) | ÷ | Divide. |
| (14) | 0 | Cardinal Numbers. |
| (15) | 1 | |
| (16) | 2 | |
| (17) | 3 | |
| (20) | 4 | |
| (21) | 5 | |
| (22) | 6 | |
| (23) | 7 | |
| (24) | 8 | |
| (25) | 9 | |
| (26) | Stop | Cease operation. |
| (27) | W⟶PC | Transfer contents of first two stages of work Register 14 to Program Counter 30. |
| (30) | W⟶DC | Transfer contents of first two stages of Work Register 14 to Decrement Counter 32. |
| (31) | DC⟶W | Transfer contents of Decrement Counter 32 to first two stages of Work Register 14. |
| (32) | W⟶A | Transfer contents of Work Register 14 to Accumulator Register 26. |
| (33) | A⟶W | Transfer contents of Accumulator Register 26 to Work Register 14. |
| (34) | W⟶L | Transfer contents of Work Register 14 to Log Register 28. |
| (35) | L⟶W | Transfer contents of Log Register 28 to Work Register 14. |
| (36) | A⟶$S_1$ | Transfer contents of Accumulator Register 26 to Storage I 34. |
| (37) | $S_1$⟶A | Transfer contents of Storage I 34 to Accumulator Register 26. |
| (40) | W⟶$S_2$ | Transfer contents of Work Register 14 to Storage II 36. |
| (41) | $S_2$⟶W | Transfer contents of Storage II 36 to Work Register 14. |
| (42) | $P_0$ | Begin program (under Card Reader control). |
| (43) | PDS | Store contents of Decrement Counter 32 in Decrement Counter Store 54 and contents of Program Counter 30 in Program Counter Store 56 and transfer contents of first two stages in Work Register 14 to Program Counter 30. |
| (44) | PDR | Recall the values in Program Counter Store 56 and Decrement Counter Store 54. |
| (45) | DEC | Step Decrement Counter 32 by one unit. |
| (46) | Test DC | Test DC for zero. |
| (47) | Test A | Test Accumulator Register 26 for zero. |
| (50) | Test W | Test Work Register 14 for zero. |
| (51) | Test L | Test Log Register 28 for sign. |

Figures 2, 3, 4, 5:
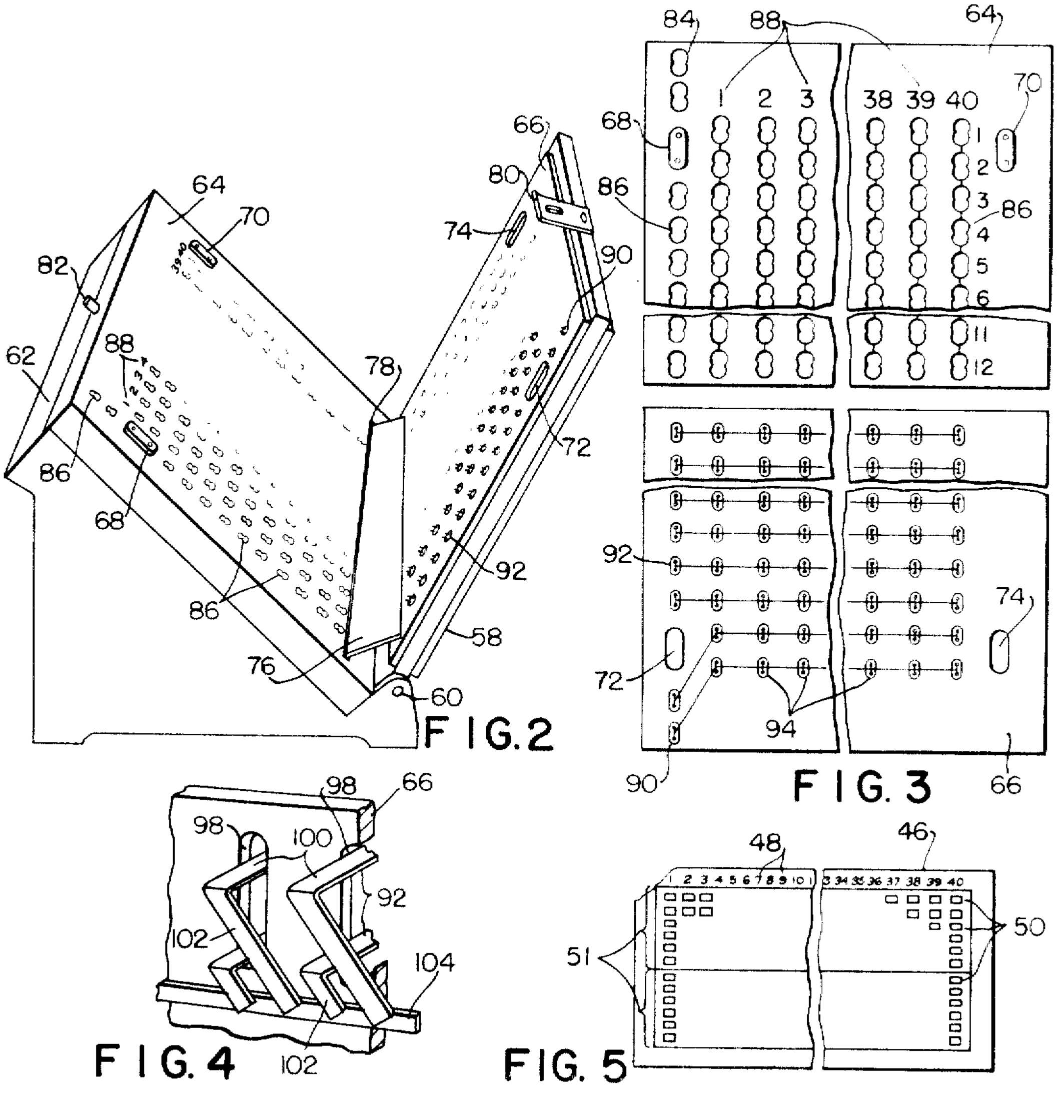
FIG. 2 is a perspective view of the card reader, in open position.
FIG. 3 is a schematic diagram of the contacts in the cover and base of the card reader.
FIG. 4 is an enlarged view of the contacts in the cover.
FIG. 5 is a view of a card usable with this system.

Card Reader 42 is shown in more detail in the open position in FIG. 2. A cover 58 is attached by hinges 60 to base 62. Card Reader 42 is designed to receive card 46 between face 64 of the base and face 66 of the cover. The card will be aligned laterally by vertical front guide 68 and vertical rear guide 70 which are received by front recess 72 and rear recess 74 in cover 58 permitting faces 64 and 66 to meet flush with the card between them. The card is held vertically in position by means of stop 76 which also acts as a limited device on the movement of cover 58; stop 76 moves into slot 78 in base 62 as the cover is closed causing no impediment to the previously mentioned flush relation of faces 64 and 66. Latch 80 and pin 82 serve to secure the cover in the closed position.

Face 64 contains a column 84 of twelve kidney shaped flat contacts 86 outside the card sensing area. In the card sensing area there is a matrix 88 of forty columns of contacts each containing twelve kidney shaped flat contacts 86 arranged on face 64 to correspond to positions to be read on Card 46, as can be seen more readily in FIG. 3.

Face 66 contains a column 90 of twelve pairs of prong contact elements 92. Column 90 is disposed so that each of its pairs of prongs 92 will contact and complete an electrical circuit with a corresponding kidney shaped contact 86 in row 84 when cover 58 is closed. A matrix 94 of forty columns, each containing twelve pairs of prong contact elements 92, are arranged on the remainder of face 66 to correspond to positions to be read on a card. The contacts in matrix 94 are disposed so that each one of the pairs of prongs 92 will contact a corresponding kidney shaped contact 86 in group 88 when cover 58 is closed, unless the corresponding data position on an interposed card has not been punched.

The forty pairs of prongs 92 in each of the twelve separate rows in matrix 94 are connected in series and are connected to a corresponding one of the twelve prongs in column 90. The kidney shaped contacts 86 in each of the eighty separate columns in matrix 88 are connected together in groups of six to an input line in cable 88 and are not connected directly to any of the contacts in column 84. The contacts in column 84 are divided in two identical groups of six and are connected to six corresponding output lines in cable 44.

When any particular group of sensors (a column of six) of a card in the Card Reader 42 is desired to be read, that column of six contacts in matrix 88 will be energized. Any positions in that column which coincide with a punched position in the corresponding column on the card will be in contact with a pair of prongs at the corresponding row and column position of matrix 94. Since all forty pairs of prongs in each row of group 94 are in series, a signal appearing at any position in a row will pass through that row to a corresponding pair of prongs in column 90 and from there via the corresponding contact 86 in column 84 to the corresponding output line.

A more detailed showing of a pair of prongs is shown in FIG. 4. Each pair of prongs 92 protrudes from cover 40 through an aperture 98 in face 66. Each prong 100 is formed integrally with a strap 102 of spring like material which acts to bias its respective prong 100 outwardly through aperture 98. Strap 102 is fastened to bus bar 104 which serves as a mounting for and electrically connects the prongs in each row.

A block diagram of a calculator system embodying the present invention is shown in FIG. 6. Accumulator 26 is a ten digit position shift register for operation in a binary coded decimal radix, thus each "position" is actually four bits. The most significant digit position is at the left and the least significant digit position is at the right of Accumulator Register 26. Work Register 14, Log Register 28 and Storage Registers 34 and 36 are of the same type as Accumulator Register 26; the entire arithmetic portion of the system operates in the binary coded decimal radix. Accumulator 26 may accumulate the sum of, or the difference between, a value which it contains and one supplied from Storage 34 via Gate 106 or from Work Register 14 via Gate 108. Adder-Subtracter 110, conditioned to add or subtract by Add-Subtract Control 112, receives the output digit of the least significant stage of Accumulator 26 at one of its inputs and receives at its other input a second digit from whichever of Gates 106 or 108 is enabled and presents the result digit to the input (most significant) stage of the Accumulator; Gate 106 is enabled by a signal at $P_{106}$ and Gate 108 by a signal at $P_{108}$. Add-Subtract Control 112 will condition Adder-Subtracter 110 to add if a signal is received at $P_{AA}$ or subtract if a signal is received at $P_{AS}$. Accumulator 26 may be shifted by the application of a pulse at $P_{26}$. The digits in Storage 34 may be shifted by application of a pulse at $P_{34}$ and information entered into it through Gate 114 by applying an enabling signal at $P_{114}$.

Information represented by Numeral Keys 18 is entered in Work Register 14 by Addressor 116. Similar numerical data received from Card Reader 42 is presented to Addressor 116 at $P_{116}$. Each time a Numeral Key 18 is depressed a binary one is stepped through Decimal Register 22 until Decimal Point Key 20 is depressed. At that time the stepping of Decimal Register 22 ceases and the position of the decimal point in the entered number is recorded.

Work Register 14 provides signals to Accumulator 26 via Gate 108, to Storage 36 via Gate 118, to Decrement Counter 32 via Gate 120, to a Program Counter 30 via Gate 122 and provides two inputs to its associated Adder-Subtracter 124. One of the inputs is connected directly to Adder-Subtracter 124 while the second input, originating at the same output of Work Register 14, may be directed through none, one or more of the Delays 126, 128, 130, and 132 depending upon which one of Gates 134, 136, 138, 140 or 142, is enabled by a signal at $P_{134}$, $P_{136}$, $P_{138}$, $P_{140}$ or $P_{142}$, respectively. The second input to Adder-Subtracter 124 may also receive a signal from Decrement Counter 32 via Gate 144 enabled by a signal at $P_{144}$, from Accumulator 26 via Gate 146 enabled by a signal at $P_{146}$, from Log Register 28 via Gate 148 enabled by a signal at $P_{148}$, or from Storage 36 via Gate 150 enabled by a signal at $P_{150}$. Work Register 14 receives information from Adder-Subtracter 124 and is shifted by a signal at $P_{14}$. The four Delays 126, 128, 130 and 132 provide a means for presenting the value stored in Work Register 14 to Adder-Subtracter 124 shifted by one, two, three or four positions depending upon which gate is enabled. Any number of delays may be used dependent upon the capabilities desired for a particular machine.

Add-Subtract Control 152 will condition Adder-Subtracter 124 to add if a signal is received at $P_{WA}$ or to subtract if a signal is received at $P_{WS}$. AND circuit 154 monitors a number of stages, other than the Most Significant Digit Stage (MSD) 156, of Work Register 14 in accordance with the accuracy desired in the calculations and will respond to an all-zero input when Add-Subtract Control 152 directs subtraction and to an all-nines input when it directs addition. The output of AND circuit 154 is applied to the Control 52 of the calculator via line *i*.

Add-Subtract Control 152 also applies a signal to Gate 158 along with one from MSD 156. Both signals will be presented to the Most Significant Digit Sensor (MSD Sensor) 160 when Gate 158 is enabled by a signal on line *j* from Control 52 which is present when the logarithm of a number in Work Register 14 is being accumulated in Log Register 28. With Add-Subtract Control 152 directing addition MSD Sensor 160 will be conditioned to seek a one in MSD 156, while a subtract direction will condition MSD Sensor 160 to seek a zero in MSD 156.

The accumulation of the logarithm of a number in Work Register 14 is accomplished in Log Register 28 through Adder-Subtracter 162. Log Register 28 is shifted by a signal at $P_{28}$ and provides outputs to Work Register 14 via Gate 148, to one input of associated Adder-Subtracter 162 and to second input of Adder-subtracter 162 via Gate 164 enabled by a signal at $P_{164}$. A second input to Adder-Subtracter 162 is provided by Log Store 166 via Gate 168 enabled by a signal at $P_{168}$. Log Modifier 170 may be caused to operate on a logarithm from Log Store 166 en route to Gate 168. For example, it may double the logarithm when the □ (square) Key 24 has been depressed, or halve the logarithm when the √ (square root) Key 24 has been depressed, upon the proper instruction from Control 52 over line *g*. Log Store 166 contains the logarithms to be used by the calculator, which may be read out by providing a signal at the appropriate one of lines $P_1$, $P_2$, $P_3$, $P_4$, $P_5$ and $P_6$. The specific embodiment here uses only six logarithm values, as will be discussed infra, but it is apparent that should greater accuracy be desired additional ones may be employed.

Log Store 166 stores the logarithmic values of pre-established constants which are related to the radix of the number system to be employed in the calculator and may be related to any desired base, for example the base 10. In this calculator the base *e* is employed and the constants are as follows:

TABLE IV.—LOGARITHMS AND CONSTANTS EMPLOYED

| Mode | Constant | Log |
|---|---|---|
| 1 | 10 | 2.302585093 |
| 2 | 2 | .693147181 |
| 3 | .9 | .105360516 |
| 4 | 1.01 | .009950331 |
| 5 | .999 | .001000500 |
| 6 | 1.0001 | .000099995 |

It will be noted that the last four constants are in the form $1 \pm 1/R^A$ where R is the radix and A is, successively, the integers 1, 2, 3, and 4. Each logarithm read out of Log Store 166, as directed by Control 52, is applied to Adder-Subtracter 168 to modify the contents of register 28 in an addition or subtraction operation, also as controlled by Control 52. Control 52 also causes the contents of Work Register 14 to be modified in multiplication and division operations by the constants. These modification operations, while coordinated, may be performed in various manners, for example at substantially the same time or one modification operation may be completed and the other then commenced and performed as a function of the first.

Add-Subtract Control 172 will condition Adder-Subtracter 162 to add if a signal is received at a $P_{LA}$ or to subtract if a signal is received at $P_{LS}$. AND circuit 174 monitors a number of stages, other than the Most Significant Digit Stages (MSD) 176, of Log Register 28 in accordance with the accuracy desired in the calculations and will respond to an all-zero input when Add-Subtract Control 172 directs subtraction and to an all-nines input when it directs addition. The output of AND circuit 174 is applied to Control 52 via line *f*.

Add-Subtract Control 172 also applies a signal to Gate 178 along with one from MSD 176. Both signals will be presented to MSD Sensor 160 when Gate 178 is enabled by a signal on line *e* from Control 52 which is present when antilogarithm of a logarithm in Log Register 28 is being accumulated in Work Register 14. With Add-Subtract Control 172 directing addition MSD Sensor 160 will be conditioned to seek a one in MSD 176 while a subtract direction will condition MSD Sensor 160 to seek a zero in MSD 176.

At certain predetermined times, such as the division by ten operation effected in the first mode of the generation of a log of a number, Control 52 provides a signal at $P_{22}$ which causes an interrogation of the most significant position of Decimal Register 22 for the presence or absence of the decimal point which information is then communicated to Control 52. If an antilogarithm is to be assembled by the machine a signal from Control 52 will remove any decimal point in Decimal Register 22. Through Delay 180 the same signal will cause the Characteristic Transfer Gate 182 to transfer the characteristic which is in MSD stage 176 to Decimal Register 22. Decimal Register 22 is a binary coded decimal register as is Log Register 28 thus allowing for direct transfer between the two.

Program Counter 30 may receive an input from Work Register 14 via Gate 122 or from Program Counter Store 56 via Gate 184 enabled by a signal at $P_{184}$. Program Counter 30 is shifted by a signal at $P_{30}$ and stepped by a signal at $P_p$; Program Counter Store 56 is shifted by a signal at $P_{56}$. The PDS command, code (43), shown in Table III transfers the contents of Decrement Counter 32 to Decrement Counter Store 54, and transfers the contents of Program Counter 30 to Program Counter Store 56 while also transferring the numbers in the two most significant positions in Work Register 14 to Program Counter 30. The values thus removed may be replaced in Program Counter 30 and Decrement Counter 32 by employing the PDR command, code (44).

Decrement Counter 32 may receive an output from Work Register 14 via Gate 120 or from Decrement Counter Store 54 which appears through Gate 190 enabled by $P_{190}$. Values in Decrement Counter 32 may be decremented by a signal at $P_D$ and shifted by a signal at $P_{32}$. A signal destined for Decrement Counter Store 54 must pass through Gate 192 enabled by $P_{192}$; data is shifted through Decrement Counter Store 54 by signals applied at $P_{54}$.

Decrement Counter 32 is used to count the number of times an iterative operation has been performed. If, for example, a particular operation is to be carried out M times, the number M may be loaded in Decrement Counter 32 and decreased by one each time the operation is performed continuing the backward counting until zero remains. After each iteration "0" Sensor 194 is tested to see if the count has been reduced to zero; if a zero is not found the system is directed to begin again at the initial step of the operation.

Associated with Control 52 is Clock Pulse Source 198 which provides the signals to Distributor Circuits 196 which Control 52 directs throughout the system as enabling and shifting signals.

The calculator of the invention performs a variety of mathematical manipulations. Simple addition and subtraction operations are accomplished by accumulating the sum or difference in Accumulator 26. Other manipulations are accomplished by operating with the logarithms of the numbers involved. Since the logarithms of only a group of preselected constants, e.g., Table IV, are stored in the system, the logarithm of each number involved is generated prior to performance of operations such as multiplication or division. The apparatus for generating logarithms will be more readily understood by reference to Table V which describes in tabular form the generation of a logarithm.

*Table V.—Operation to generate a logarithm*

(1) A number is entered in Work Register (WR) 14 under the control of the Numeral Keys 18 or the Card Reader (CR) 42.

(2) The multiply instruction is conducted to Control 52 via line *k* either by depressing the Multiply (×) Key 24 or through CR 42. This initiates the series of manipulations indicated in Table IV.

(3) Mode 1 (Table IV) senses the position of the decimal point and begins by Control 52 presenting an interrogating signal to Decimal Register (DR) 22 at $P_R$. A signal will appear on line *a* if the decimal point is not present in the most significant position of DR 22 and on line *b* if it is.

(4) A signal appearing on line *a* causes Control 52 to present a basic cycle of signals to the system (generated by Clock Pulse Source 198 and distributed by Distribution Circuits 196). A signal is routed to $P_{22}$ shifting the decimal point one position toward the most significant stage of DR 22, thereby effectively dividing the value in WR 14 by a value of ten, to $P_{LA}$ placing Add-Subtract Control (ASC) 172 and AND circuit 154 in the addition state, and to $P_{168}$ Enabling Gate 168. A series of ten signals are routed to $P_1$ and $P_{28}$ combining, negatively, the log of 10 in Log Store (LS) 166 with the value (initially zero) in Log Register (LR) 28 through Adder-Subtracter (AS) 162 and accumulating their sum in LR 28. A pulse will now cause Control 52 to interrogate DR 22 as to the position of the decimal point. If it is not present in the most significant position a signal will appear on line *a* and cause the foregoing operation to be repeated until the decimal point is at the most significant position (the number in WR 14 has an effective value of less than one).

(5) When the decimal point is present at the most significant position a signal will appear on line *b* initiating operation in mode 2, Table IV. Control 52 now presents a signal at $P_{WA}$ setting ASC 152 to the addition state and ASC 172 receives a signal at $P_{LS}$ setting it to the subtraction state. A signal will now appear on line *c* if the value in MSD 156 is a one or on line *d* if the value is a zero.

(6) A signal appearing on line *d* causes Control 52 to present a basic cycle of signals to the system. Signals are applied to $P_{14}$ and $P_{142}$ causing each digit in WR 14 to be applied to both inputs of AS 174 thus adding the value in WR 14 to itself; in a doubling operation $P_2$, $P_{28}$, $P_{164}$ and $P_{168}$ also receive signals causing each digit in LR 28 to have subtracted from it the corresponding digit of the log of 2 through operation of AS 162. Thus, the log of two is subtracted from the value in LR 28. The condition of lines *c* and *d* will now be checked. If the value in MSD 156 is still zero a signal on line *d* will cause Control 52 to repeat the operation. If a one is found a signal will appear on line *c* initiating mode 3, Table IV.

(7) A signal on line *c* causes a signal at $P_{LA}$ setting ASC 172 to the addition state and a signal at $P_{WS}$ setting ASC 152 to the subtraction state. Since a one is present in MSD 156 a signal will appear on line *d* causing a series of ten signals to be presented at $P_{14}$ and $P_{140}$, thus subtracting from the number in WR 14 a once shifted value of that number and effectively multiplying it by nine-tenths. Simultaneously, signals are applied at $P_{28}$, $P_{164}$, $P_{168}$ and $P_3$ shifting the log of 0.9 out of LS 166 and adding it to the value in LR 28. The condition of lines *c* and *d* are next checked and if the value in MSD 156 is still not zero a signal on line *d* causes the operation to be repeated. If it is zero, a signal will appear on line *c* initiating mode 4, Table IV.

(8) A signal on line *c* now causes $P_{WA}$ and $P_{LS}$ to receive signals conditioning ASC's 152 and 172 to the addition state and subtraction state, respectively. A zero being present in MSD 156, a signal will appear on line *d* causing signals to be applied at $P_{14}$ and $P_{138}$, thus adding the number in WR 14 to a twice shifted value of itself and effectively multiplying that number by 1.01. $P_{28}$, $P_{164}$, $P_{168}$ and $P_4$ are simultaneously provided with signals thereby subtracting the log of 1.01 from the value in LR 28. Lines *c* and *d* are next checked and if a zero is still present in MSD 156 a signal on line *d* causes the operation to be repeated. If a one is now present, a signal on line *c* initiates mode 5, Table IV.

(9) A signal on line *c* now causes $P_{LA}$ and $P_{WS}$ to receive signals conditioning ASC's 172 and 152 to the subtraction state and addition state, respectively. A one being present in MSD 156, a signal will appear on line *d* causing signals to be applied at $P_{14}$ and $P_{136}$, thus subtracting from the number in WR 14 a thrice shifted value of that number and effectively multiplying it by 0.999. Simultaneously, signals are applied at $P_{28}$, $P_{164}$, $P_{168}$ and $P_5$ shifting the log of 0.999 out of LS 166 and adding it to the value in LR 28. Lines *c* and *d* are checked and if the value in MSD 156 is still not zero a signal on line *d* causes the operation to be repeated. If it is a zero, a signal will appear on line *c* initiating mode 6, Table IV.

(10) A signal on line *c* now causes $P_{LS}$ and $P_{WA}$ to receive signals conditioning ASC's 172 and 152 to the addition state and subtraction state, respectively. A zero being present in MSD 156, a signal will appear on line *d* causing signals to be applied at $P_{14}$ and $P_{134}$, thus adding the number in WR 14 to a four times shifted value of itself and effectively multiplying it by 1.0001. Simultaneously, signals are applied at $P_{28}$, $P_{164}$, $P_{168}$ and $P_6$ shifting the log of 1.0001 out of LS 166 and subtracting it from the value in LR 28. Lines *c* and *d* are next checked and if the value in MSD 156 is still not one, a signal on line *d* causes the operation to be repeated. If it is a one, a signal will appear on line *c* thus ending the operation and, if the system is under control of CR 42, presenting a signal at $P_p$ to step Program Counter 30.

An example of this operation applied to a particular number is indicated in Table VI where the steps using the six modes of Table IV to generate the log to the base *e* of the number 2.10 by this apparatus are set forth.

TABLE VI.—GENERATING THE LOG OF 2.1

| Mode | Constant Applied | Register 14 | Register 28 |
|---|---|---|---|
| | | 2.100000 | 0.00000 |
| 1 | 10 | .210000 | 2.30259 |
| 2 | 2.0 | .420000 | 1.60944 |
| 2 | 2.0 | .840000 | .91629 |
| 2 | 2.0 | 1.680000 | .22314 |
| 3 | 0.9 | 1.512000 | .32850 |
| 3 | 0.9 | 1.360800 | .43389 |
| 3 | 0.9 | 1.224720 | .53922 |
| 3 | 0.9 | 1.102248 | .64458 |
| 3 | 0.9 | .992024 | .74994 |
| 4 | 1.01 | 1.001944 | .73999 |
| 5 | 0.999 | 1.000943 | .74099 |
| 5 | 0.999 | .999943 | .74199 |
| 6 | 1.0001 | 1.000042 | .74189 |

If multiplication is to be performed, the multiplier is loaded into Work Register 14 and the logarithm of this quantity is generated in the same manner as described above, thus that quantity is added to the log value already stored in the Log Register 28. If division is to be performed, the steps of generating the logarithm of the second number are performed in complement sequence so that that quantity is effectively subtracted from the value stored in the Log Register 26.

When it is desired to obtain the natural number from a logarithm (antilog), the steps are reversed with the Work Register 14 being set initially to the value 1.0, Log Register 28 containing the logarithm of the value to be set into Work Register 14. A signal from Control 52 will clear Decimal Register 22, and that signal, applied through Delay 180, will cause Characteristic Transfer Gate 182 to transfer to Decimal Register 22 the position of the decimal point as represented by the value of the characteristic of the logarithm in Log Register 28. Subsequent steps are now performed in the same manner as set forth above for generating the log.

The automatic performance of a series of instructions by this system is begun by the keying of $P_0$ Key 40 which enables Gate 186 to pass the instructions received from Card Reader 42 to Instruction Decoder 200. These instructions are read from Card 46 where they are recorded in 6 bit octal code. Each of the positions are individually identifiable by means of Program Counter 30. Card 46 has positions for eighty such instructions. These instructions read from Card 46 do not, as would be the case in a computer, contain an operation portion and an address portion. Rather each is composed of only an operation portion. The instruction signals are decoded by Instruction Decoder 200 and output signals are presented to Control 52 via line *k* to set Instruction Register 202.

A signal on line *n* inhibits presentation of further signals from Instruction Decoder 200 to Instruction Register 202 while an instruction is being carried out. During the execution of an instruction a signal appearing on line *l* causes Stepper 204 to advance Program Counter 30 to identify the next instruction in the sequence and actuate Card Reader 42 to sense that position of Card 46. The next instruction then is decoded by Decoder 200 and output signals are available when the inhibit signal terminates.

An instruction to transfer a value from Work Register 14 to Decrement Counter 32 enables Control 52 to present a signal at $P_{208}$ and $P_D$ each time a test of "0" Sensor 194 does not show a zero present and to present three signals to Program Counter 30 when a zero is present. The testing of "0" Sensor 194 is effected by a pulse on $P_{194}$ which results in a signal on line T indicating the presence or absence of a zero. The T output of "0" Sensor 194 is presented to Control 52. If the T signal indicates the presence of a zero, a signal is presented to Stepper 204 on line T′ to step Program Counter three times to identify the third following position on Card 46. If the T signal indicates a zero is not present, a signal is presented at $P_{208}$ causing Stepper 208 to step Decrement Counter 32 and a signal is presented on line *l* causing Stepper 204 to step Program Counter 30. Similar test responses such as delivered by the T outputs of Registers 14 and 26 have a similar effect on Stepper 204.

Whenever Stepper 204 steps Program Counter 30 three times, it is performing a rudimentary type of branching in that a non-sequential instruction is selected. The number of times Program Counter 30 is stepped by Stepper 204 in this manner can be any number which the designer desires. But it will be obvious that this type of branching operation is not easily susceptible of being changed to meet the needs of individual series of instructions.

A second and more flexible type of branching also performed by this system utilizes principally only the number input equipment of the calculator plus a transfer instruction. A branch operation of this type requires three instructions. The first instruction enters in Work Register 14 the first of two numbers identifying the instruction to be branched to. The second instruction enters the second number identifying the instruction to be branched to. And the third instruction transfers the two numbers from Work Register 14 to Program Counter 30 ($W \longrightarrow PC$). In this manner any instruction in a series of instructions may be identified in Program Counter 30 as the next instruction to be performed.

These two types of branching enable the calculator to perform a decisional operation. An instruction calling for a test of "0" Sensor 194 may be followed by two instructions to place the numbers representing a particular program step in Work Register 14 and the transfer instruction calling for a transfer from Work Register 14 to Program Counter 30. Thus, if a zero is present, Program Counter 30 will be stepped three times by Stepper 204 eliminating the intervening three branch instructions. If a zero is not present, Program Counter 30 will be stepped one instruction at a time until the address placed in Program Counter 30 by the $W \longrightarrow PC$ instruction are encountered; the next instruction followed is that specified by the number transferred to the Program Counter and may be any one present in the series of instructions in the record in the Card Reader.

The performance of the calculator under control of a program and the use of the branching instruction may be better understood by means of an example of a typical program.

A program for the computation of N! utilizes Decrement Counter 32 to control the iterative operation involved. First N is keyed into Work Register 14 using Numeral Keys 18. Pressing $P_0$ Key 40 will start Program Counter 30 to sequence through the program beginning at step 00. Referring to the chart of the program below, there is a loop between steps 01 and 07 to accumulate the log of the product and to keep count of the number of iterations through the loop.

TABLE VII.—EXAMPLE PROGRAM

| Step No. | Code | Command | Remarks |
|---|---|---|---|
| 00 | 30 | W—→DC | Transfer integer N from Work Register 14 to Decrement Counter 32. |
| 01 | 31 | DC—→W | Transfer integer in Decrement Counter 32 to Work Register 14. |
| 02 | 06 | × | Multiply the previous value in Work Register 14, by the present value (accumulating the logs of N, (N-1), . . . 2, 1). |
| 03 | 45 | Decrement | Subtract 1 from Decrement Counter 32. |
| 04 | 46 | DC Test | Test Decrement Counter 32, if zero step to step 08, if not zero step to step 05. |
| 05 | 14 | 0 | Place a zero in first position of Work Register 14. |
| 06 | 15 | 1 | Place a 1 in second position of Work Register 14. |
| 07 | 27 | W—→PC | Place 01 in Program Counter 30 as an address thus beginning another iteration. |
| 08 | 10 | LN-1 | Take antilog of logarithm in Log Register 28. |
| 09 | 26 | STOP | |

While the apparatus has been described largely in conjunction with the decimal radix, it will be obvious that the invention is not limited thereto and provides calculating mechanisms which may operate in any desired radix to perform multiplication, division, and other complex mathematical calculations through the use of logarithms, which also may be to any desired base. The storage capacity required for the calculator is small, as only selected logarithmic values need be stored. The simplicity of the logic enables the calculator to be a compact device suitable for desk type use and enables accurate calculations to be performed with facility heretofore impossible except with much larger and more complex devices.

While a preferred embodiment of the invention has been shown and described, various modifications thereof will be apparent to those having ordinary skill in the art, and therefore it is not intended that the invention be limited to the described embodiment or to details thereof and departures may be made therefrom within the spirit and scope of the invention as defined in the claims.

What is claimed is:

1. A calculator comprising:
input means having a plurality of manually actuable control elements including ten manual control keys representing numerical values from 0 through 9,
input register means for accumulating a numerical value entered by said control keys,
an arithmetic unit coupled to said input register means for manipulating the numerical value in said input register means in response to instructions entered by certain of said manually actuable control elements,
a record receiving device for receiving a record having data items recorded thereon in predetermined discrete coordinately related locations, certain of said data items providing the same arithmetic unit control instructions as arithmetic unit control instructions provided by certain of said manually actuable control elements,
a data item sensor in said record receiving device, said data item sensor being coupled to said arithmetic unit,
control means for causing said sensor to sense sequentially data items recorded on said record and provide output signals representative of the sensed data item on the record disposed on said device to cause said arithmetic unit to execute a sequence of operations.
a control register,
means to modify the data in said control register in response to a data manipulation by said arithmetic unit,
a test circuit coupled to said control register,
and means responsive to a predetermined output of said test circuit to actuate said control means to skip a predetermined number of data items in the record in said record receiving device to effect a modification of the sequence of operations executed by said arithmetic unit.

2. The calculator as claimed in claim 1 wherein said record is a card, said control means includes a counter which is stepped to cause said data item sensor to sense the next data item recorded on said record, and said test circuit output responsive means steps said counter a predetermined number of steps in response to said predetermined output.

3. The calculator as claimed in claim 2, wherein said card has said data items recorded thereon in a two dimensional configuration, said data item sensor includes a plurality of sensing elements arranged in a two dimensional matrix corresponding to the data item configuration on said card and said control means normally actuates said sensing elements in a predetermined sequence and said test circuit output responsive means causes said control means to skip a predetermined number of sensing elements in said sequence.

4. A calculator comprising:
input means having a plurality of manually actuable control elements including ten manual control keys representing numerical values from 0 through 9,
input register means for accumulating a numerical value entered by said control keys,
an arithmetic unit coupled to said input register means for manipulating the numerical valve in said input register means in response to instructions entered by certain of said manually actuable control elements,
a record receiving device for receiving a record having data items recorded thereon in predetermined discrete coordinately related locations, certain of said data items providing the same arithmetic unit control instructions as arithmetic unit control instructions provided by certain of said manually actuable control elements,
a data item sensor in said record receiving device, said data item sensor being coupled to said arithmetic unit,
control means for causing said sensor to sense sequentially data items recorded on said record and provide output signals representative of the sensed data item on the record disposed on said device to cause said arithmetic unit to execute a sequence of operations,
and branching control including data item entry means responsive to data items recorded on the record disposed in said record receiving device to enter a series of numerical values in said input register means to define a data item, and data item transfer means responsive to a data item recorded on the record held in said record receiving device to transfer the contents of said input register to said control means to cause said sensor to sense a data item other than the next data item in sequence on the record.

5. The calculator as claimed in claim 4 wherein said record is a card, said control means includes a counter which is stepped to cause said data item sensor to sense the next data item recorded on said record, and said data item transfer means changes the setting of said counter to cause said sensor to sense the data item specified by the new setting of the counter.

6. The calculator as claimed in claim 5 wherein said card has said data items recorded thereon in a two dimentional configuration, said data item sensor includes a plurality of sensing elements arranged in a two dimensional matrix corresponding to the data item configuration on said card and said control means normally actuates said sensing elements in a predetermined sequence and said data item transfer means causes said control means to omit at least one sensing element in said sequence.

7. The calculator as claimed in claim 6 and further including a control register, means to modify the data in said control register in response to a data manipulation by said arithmetic unit, a test circuit coupled to said control register, and means responsive to a predetermined output of said test circuit to actuate said control means to skip a predetermined number of data items in the record in said record receiving device to effect a modification of the sequence of operations executed by said arithmetic unit.

8. The calculator as claimed in claim 7 wherein said test circuit output responsive means steps said counter a predetermined number of steps in response to said predetermined output.

9. The calculator as claimed in claim 8 wherein said card has a plurality of groups of apertures representing data items, said sensing elements are electrical contact members and said test circuit output responsive means causes said counter to skip a predetermined number of contact members in said sequence.

References Cited

UNITED STATES PATENTS

| | | | |
|---|---|---|---|
| 3,000,555 | 9/1961 | Innes | 235—61.6 |
| 3,239,820 | 3/1966 | Logan et al. | 340—172.5 |
| 3,267,433 | 8/1966 | Falkoff | 340—172.5 |
| 3,277,446 | 10/1966 | Diamant et al. | 340—172.5 |
| 3,303,477 | 2/1967 | Voigt | 340—172.5 |
| 3,328,763 | 6/1967 | Rathbun et al. | 340—172.5 |
| 3,330,946 | 7/1967 | Souitto | 235—160 |

PAUL J. HENON, *Primary Examiner.*

R. B. ZACHE, *Assistant Examiner.*